March 22, 1932.  H. ALBERTINE  1,850,860
COUPLER
Filed May 16, 1928
Fig.1.
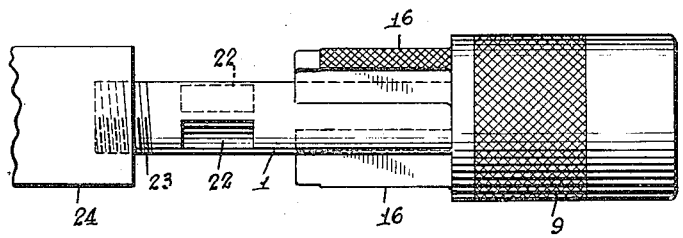
Fig.2.
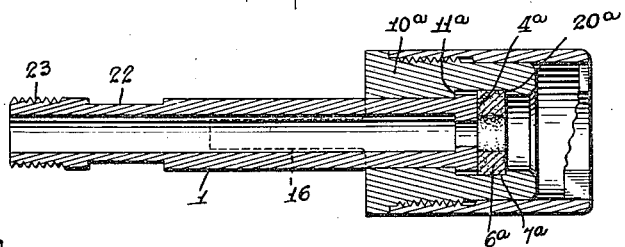
Fig.3.
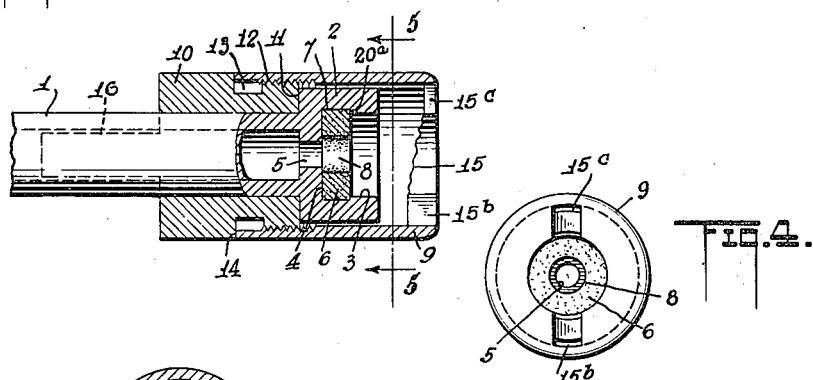
Fig.4.
Fig.5.
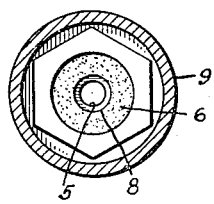
INVENTOR
*Herman Albertine.*
BY
*[signature]*
ATTORNEY Patented Mar. 22, 1932

1,850,860

UNITED STATES PATENT OFFICE

HERMAN ALBERTINE, OF EAST RUTHERFORD, NEW JERSEY

COUPLER

Application filed May 16, 1928. Serial No. 278,283.

My present invention relates to detachable couplers of the type set forth in my applications Ser. No. 132,454, filed August 30, 1926, and Ser. No. 189,210, filed May 6, 1927. They are designed for use in connection with force feed lubricators or grease guns to supply oil or grease to bearings, either through the usual valved fittings in accordance with the system described in the British patent to Alley et al., No. 21,893 of 1906, or by screwing the coupling into the threaded end of the duct after the grease cup or other fitting has been removed. While my coupler is particularly adapted for withstanding high pressures such as 10,000 pounds to 15,000 pounds per square inch, it is also useful in connection with the very much lower pressures such as are commonly attainable in ordinary hand-operated grease guns.

By my present invention, the swivel that permits screwing and unscrewing is embodied in the coupling; also the coupling is better adapted for manipulation in relatively inaccessible locations and is provided with means whereby the screwing and unscrewing efforts may be applied more easily and with less danger of damage to the coupler.

The above and other features of my invention will be more evident from the following detailed description in connection with the accompanying drawings, in which Fig. 1 is a side elevation showing one desirable form of my coupler;

Figs. 2 and 3 are longitudinal sections showing internal constructions of a coupler such as shown in Fig. 1;

Fig. 4 is an end view from the right, Fig. 3; and

Fig. 5 is a transverse section on the line 5—5, Fig. 3.

Referring to Figs. 1 and 4, the latter being in some respects simpler than the form shown in Fig. 2, the coupler is shown as comprising a tubular member 1, formed with a head 2 having a cylindrical recess 3 affording an annular support surface 4 surrounding a grease inlet hole 5 supporting a thick annular washer 6 of suitable yielding or compressible material such as leather, which fits snugly against the surrounding wall 7 so that radial expansion of the washer is prevented and the expansive forces take effect longitudinally in the direction of the thickness of the washer. The hole 8 through the annular washer is preferably larger than the hole 5, so that the entering grease cannot get behind the washer or cause any tendency to force the same forward.

Screw elements are provided for forcing the packing washer against the end of the nipple, in the form of a sleeve 9 within which the head 2 is swiveled. The swivel connection is afforded by an annular member 10 the interior of which fits and is adapted to rotate and slide longitudinally on tubular member 1, and the forward face 11 of which fits against the annular rear face of the head 2. The sleeve member 9 is detachably secured to 10 by screw thread 12. As this is normally a rigid connection, I prefer to form an annular recess 13 so that the rear end of the sleeve 9 can have its rear edge screwed into tight clamping engagement as shown at 14. The sleeve 9 is formed at its open forward end with internal screw surfaces 15, each comprising nearly a half turn of what is in effect a double threaded screw. These double-thread screw elements are adapted to engage the fitting or nipple of a lubricating duct, particularly the projecting arms or studs of nipples or pin fittings of the type shown in my said application Ser. No. 189,-210. The recess 3 in the head of the registering opening in the screw sleeve 9 are of proper size for loose fit on the forward end of such a nipple, while the slots 15b, 15c are of proper diameter to receive said studs.

The head being applied to the nipple, so as to bring said studs within range of the screw threads 15, and the end of the nipple in contact with the front face of the washer or packing 6, the head is rotated sufficiently to compress the packing between the end of the nipple and the stationary support surface 4. In cases where the inclined or "screw" surfaces 15 are so steep as to cause danger of slip and unscrewing when great pressure is applied, said surfaces may be roughened as shown.

As will be evident, the rotary movement of the screw sleeve 9 is by swivel rotation on the member 1, 2 as contrasted with the form shown in my prior application, wherein the entire structure corresponding to 1, 2, 8 is connected with the source of grease to an exterior swivel. The exterior swivel is dispensed with and the interior swivel is in a position where it is not only protected from dirt but in actual practice is surrounded by lubricating grease that escapes and gradually accumulates in the sleeve 9.

A further and much more important advantage of this form of swivel is that the sleeve member 10 is provided with strong rearwardly extended arms or lugs, 16, 16, having substantially radial surfaces against which rotary effort may be applied for screwing and unscrewing the coupler. Having the lugs integral with the rear screw section of the sleeve member has the advantage that where violent effort is required for unscrewing, the lugs can turn said section in a direction which will unscrew the thread that connects the rear section to the front section, thereby permitting the tubular member 1 to move rearwardly the slight distance necessary to free the pin fitting from the coupling threads. It will be noted that the point of application of such effort, either by hand or by tool, may be at a point practically in the outer surface of the cylinder of the sleeve. Moreover, if the grip is by the hand of the user, there is less danger of slippage and skinning of fingers, whereas if the grip is by means of a wrench, the exterior surface of the coupler will not be marred by the wrench. In operation of this device, it will be noted that while the nipple is clamped against the face of washer 6 and the grease pressure is applied, the pressure takes effect radially within the perforation 8 and tends to enlarge the same, but radial expansion is prevented by the encircling wall 7 and actual expansion, if any there is, must take effect longitudinally against the end of the nipple to maintain a perfect seal. It will be noted that the radial thickness of the walls of this washer is almost the same as the axial thickness and as it accurately fits and fills the cavity, very little deformation of the walls by pressure within the perforation will operate to produce the endwise sealing expansion. Consequently, it will be found in practice that the higher the pressure, the more perfect is the seating of the washer against the stationary support 4, encircling wall 7 and the end of the nipple.

In the form shown in Fig. 2, further advantage is taken of this sealing action of my washer. In this figure, the tubular member 1 may be the same as before, but the head is merely an annular flange, the front face of which, 4a affords the stationary support for the washer 6a, and the encircling wall 7a that confines the washer peripherally is the inner surface of the swivel retaining sleeve 10a that is rotatably mounted on the tubular member 1. It has a surface 11a engaging against the rear flange surface of the head, but this surface is narrow because, as will be seen, the tubular member 1 must be inserted through the passage in the sleeve 10a and the size of the passage is limited because it must afford a fairly close guide for the end of the nipple. It will be noted that in Fig. 2, as also in Fig. 3, there is a very shallow shoulder at 20a to retain the washer, and as the swivel head must pass through the constriction in advance of the washer, the head is somewhat smaller than the recess in which it turns. However, this does not result in any tendency to leak, since the above described expansion of the washer under internal pressure of the grease operates to seal the swivel as effectively as it does the end of the nipple.

In Fig. 1, the rear end of the tubular member is shown as provided with diametrically opposite flat faces 22, to which a wrench may be applied to screw the thread 23 into practical locking engagement with the supply conduit which is diagrammatically represented at 24.

As will be evident from Fig. 5, the periphery of the enlarged head at the forward end of tubular member 1 is preferably formed as a hexagonal nut. This may be used as a supplement to or in place of the flats 22 for screwing and unscrewing the connection of the tubular member with the source of high pressure grease. The advantage is that the head can be of much larger diameter, affording better leverage for the screwing or unscrewing effort than do the flats 22. It is obvious that when the hexagonal faces of the head are used in this way, the sleeve sections are unscrewed and the forward section removed.

I claim:—

1. A coupler for connecting a grease duct with a pressure supply of lubricant, including a member having a tubular portion with a longitudinal duct, a threaded rear end and an enlarged head formed with an enlarged forwardly presented recess forming a continuation of said duct, a thick cylindrical perforated elastic washer bottomed in said recess and fitting and filling the same and having the interior of its perforation exposed directly to the grease supplied through said duct, and a flange projecting inwardly from said head and engaging said washer at the front side thereof, in combination with a sleeve member which is longitudinally slidable on the tubular portion of the first mentioned member within which said head is swiveled, and means carried by said sleeve member for holding a nipple in engagement with the front face of said washer.

2. A coupler for connecting a nipple with a pressure supply of lubricant, including a tubular member having a rear end adapted for attachment to a source of lubricant under pressure, and means for effecting a tight connection between said nipple and said tubular member including a sleeve member on said tubular member, said sleeve member comprising a rear portion rotatable and slidable upon said tubular member and a forward portion connected thereto by a screw thread and carrying at the forward end thereof a pair of inwardly projecting shoulders for screw engagement with the lugs of a cooperating grease fitting; and said rear member having two parallel lugs extending rearwardly therefrom on opposite sides of said tubular member and of substantially the same external diameter as said sleeve member to enable turning of said head from a point to the rear thereof to make said connection effective or ineffective.

3. A coupler for connecting a nipple with a source of lubricant under pressure, including a tubular member formed at its forward end as a flat bottom tubular cup, said tubular member having a rear end adapted to be secured to or released from said source of lubricant by turning of the tubular member in one direction and the opposite direction respectively and having flats arranged around the same for engagement by a wrench, and means for effecting a tight connection between said nipple and said tubular member including a cylindrical sleeve member swiveled on said tubular member and having two lugs having their outwardly presented surfaces cylindrical and extending rearwardly from said head on opposite sides of said tubular member to enable turning of said head from a location at the rear thereof.

4. A coupler for connecting a nipple with a source of lubricant under pressure, including a tubular member having a rear end adapted to be secured to or released from said source of lubricant by turning in one direction or the opposite, respectively, and being formed close to said securing portion for cooperation with an implement suitable for the purpose, and means for effecting a tight connection between said nipple and said tubular member including a head swiveled on the forward end of said tubular member and having a plurality of lugs extending rearwardly therefrom along said tubular member to a position somewhat to the front of the portion of said tubular member adapted for engagement by said implement.

5. A coupler for connecting a nipple with a source of lubricant under pressure, including a tubular member formed with a cup-shaped forward end of greater external diameter than the main body of said member, communicating with the interior of said main body through a restricted opening, and having an internal annular shoulder at the forward end of said restricted opening, a washer with a central opening larger than said restricted opening positioned in said cup behind said shoulder with the interior surface of said central opening exposed directly to the pressure of the lubricant supplied through said tubular member, and means for holding said nipple in engagement with said washer including a sleeve member surrounding said tubular member and engaging against a rearwardly presented surface of the cup-shaped forward end.

6. A coupler for connecting a lubrication duct nipple with a source of lubricant under pressure, including a tubular member having a main body portion formed with in-cut flats at its rear end for attachment by turning to said source of supply and at its forward end with a cup-shaped portion projecting radially beyond the outer surface of the main body portion, said cup-shaped portion communicating through a restricted opening in its bottom with the interior of said main body and formed at its outer periphery with flats for engagement by a wrench, a packing in said cup-shaped portion, and means for holding said nipple in engagement with said washer including a sleeve member surrounding said main body and against a rearwardly presented surface of said cup-shaped portion.

7. A coupler for connecting a grease duct fitting with a pressure supply of lubricant, including a tubular member having an exterior cylindrical surface and formed at the front end with an enlarged head having an annular shoulder surface presented rearwardly and having its front face formed as a seat for a washer; a two-part sleeve comprising a rear section slidable and rotatable on the cylindrical exterior of said tubular member and formed for swivel engagement with the rear surface of said enlarged head, and a forward portion screw-threaded to said rear portion and provided at its forward end with internal projections formed for screwing engagement with a cooperating fitting; the rear part of said swivel sleeve being formed with two parallel lugs extending rearwardly therefrom on opposite sides of said tubular member, whereby the sleeve may be turned to tighten the screw coupling of the forward member with the fitting, while also tending to tighten screw thread connection between said rear and front parts of the sleeve members, and whereby if excessive effort is required for unscrewing the front member from the fitting, the unscrewing effort may operate to unscrew the rear from the front part of the sleeve.

Signed at New York, in the county of New York and State of New York, this 15th day of May, A. D. 1928.

HERMAN ALBERTINE.